(12) United States Patent
Wang et al.

(10) Patent No.: US 12,511,066 B2
(45) Date of Patent: Dec. 30, 2025

(54) SYSTEMS AND METHODS FOR DATA STORAGE IN A STORAGE DEVICE

(71) Applicant: ZHEJIANG DAHUA TECHNOLOGY CO., LTD., Zhejiang (CN)

(72) Inventors: Zhihao Wang, Hangzhou (CN); Kongqiang Li, Hangzhou (CN); Xin Luo, Hangzhou (CN); Wenlong Jiang, Hangzhou (CN); Mingwei Zhou, Hangzhou (CN); Xiumei Ying, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/677,820

(22) Filed: May 29, 2024

(65) Prior Publication Data

US 2024/0311031 A1    Sep. 19, 2024

Related U.S. Application Data

(63) Continuation of application No. PCT/CN2022/134884, filed on Nov. 29, 2022.

(30) Foreign Application Priority Data

Nov. 30, 2021    (CN) .......................... 202111447408.X

(51) Int. Cl.
     *G06F 3/06*      (2006.01)
(52) U.S. Cl.
     CPC .......... *G06F 3/0644* (2013.01); *G06F 3/0608* (2013.01); *G06F 3/0676* (2013.01)

(58) Field of Classification Search
CPC ..... G06F 3/0644; G06F 3/0608; G06F 3/0676
See application file for complete search history.

(56) References Cited

U.S. PATENT DOCUMENTS

| 9,128,820 | B1 * | 9/2015 | Malina | ................ G06F 12/0238 |
| 9,383,923 | B1 * | 7/2016 | Malina | ............. G11B 20/10527 |

(Continued)

FOREIGN PATENT DOCUMENTS

| CN | 104461390 A | 3/2015 |
| CN | 104991746 A | 10/2015 |

(Continued)

OTHER PUBLICATIONS

The Extended European Search Report in European Application No. 22900445.2 mailed on Jan. 23, 2025, 9 pages.

(Continued)

*Primary Examiner* — Ryan Bertram
(74) *Attorney, Agent, or Firm* — METIS IP LLC

(57) ABSTRACT

Systems and methods for data storage in a storage device are provided in the present disclosure. The method may include dividing the storage device into a recording region and a shingled magnetic recording (SMR) region. The SMR region may be configured to store data, and the recording region may be configured to store storage information associated with the storage device. The storage information may include at least a corresponding relationship between an index of the data and a storage location of the data. The method may also include obtaining target data to be stored. The method may further include determining, based on the target data and the storage information, a target position in the SMR region for storing the target data.

20 Claims, 7 Drawing Sheets

(56) References Cited

U.S. PATENT DOCUMENTS

| | | | |
|---|---|---|---|
| 2014/0201424 A1* | 7/2014 | Chen ..................... | G06F 3/0664 |
| | | | 711/112 |
| 2016/0064030 A1* | 3/2016 | Pitchumani ........ | G11B 20/1217 |
| | | | 360/48 |
| 2016/0224260 A1 | 8/2016 | Bandic et al. | |
| 2017/0033806 A1* | 2/2017 | Arslan ................ | G06F 3/0616 |
| 2018/0366158 A1 | 12/2018 | Luo et al. | |
| 2019/0244638 A1* | 8/2019 | Boyle ..................... | G11B 5/09 |
| 2020/0125268 A1 | 4/2020 | Li et al. | |
| 2022/0413706 A1* | 12/2022 | Ye ........................ | G06F 3/0649 |

FOREIGN PATENT DOCUMENTS

| | | | |
|---|---|---|---|
| CN | 105867836 | A | 8/2016 |
| CN | 107704211 | A | 2/2018 |
| CN | 108255408 | A | 7/2018 |
| CN | 111506251 | A | 8/2020 |
| CN | 111651127 | A | 9/2020 |
| CN | 112416891 | A | 2/2021 |
| CN | 114217741 | A | 3/2022 |
| KR | 101525453 | B1 | 6/2015 |

OTHER PUBLICATIONS

International Search Report in PCT/CN2022/134884 mailed on Feb. 21, 2023, 4 pages.
Written Opinion in PCT/CN2022/134884 mailed on Feb. 21, 2023, 4 pages.

* cited by examiner

SYSTEMS AND METHODS FOR DATA STORAGE IN A STORAGE DEVICE

CROSS-REFERENCE TO RELATED APPLICATIONS

This application is a Continuation of International Application No. PCT/CN2022/134884, filed on Nov. 29, 2022, which claims priority of Chinese Patent Application No. 202111447408.X, filed on Nov. 30, 2021, the entire content of each of which is incorporated herein by reference.

TECHNICAL FIELD

The present disclosure generally relates to storage technology, and in particular, to systems and methods for data storage in a storage device.

BACKGROUND

With the development of information technology, the scale (e.g., the size and/or amount) of data continues to expand. For the demand for massive data storage, the storage device needs to have high data storage efficiency. In order to meet the requirement of large data storage, storage devices with higher density are used for data storage. For example, a shingled magnetic recording (SMR) disk is a new type of storage device that has high storage density and sequential read-and-write performance. However, current data storage in the storage device may cause data redundancy, a waste of storage space, and/or low storage efficiency. Therefore, it is desirable to provide effective systems and methods for data storage in a storage device, thereby improving the efficiency of data storage in the storage device.

SUMMARY

In an aspect of the present disclosure, a method for data storage in a storage device is provided. The method may include dividing the storage device into a recording region and a shingled magnetic recording (SMR) region; obtaining target data to be stored; and determining, based on the target data and the storage information, a target position in the SMR region for storing the target data. The SMR region may be configured to store data, and the recording region may be configured to store storage information associated with the storage device. The storage information may include at least a corresponding relationship between an index of the data and a storage location of the data.

In some embodiments, the SMR region may be divided into a plurality of zones each of which is configured to store one or more data blocks in series. The storage information may further include zone information of each of the plurality of zones. The zone information of each of the plurality of zones may include an available state of the zone.

In some embodiments, the determining, based on the target data and the storage information, the target position in the SMR region may include determining, based on the target data and the zone information of each of the plurality of zones, a target zone from the plurality of zones; and determining the target position based on the target zone.

In some embodiments, the determining, based on the target data and the zone information, the target zone from the plurality of zones may include determining, based on the target data and the zone information, one or more candidate zones from the plurality of zones; and determining the target zone from the one or more candidate zones. An available storage capacity of each of the one or more candidate zones may be larger than a size of the target data.

In some embodiments, the target data may include one or more target data blocks. For each of the one or more target data blocks, the method may further include labeling block metadata of the target data block with a first identifier indicating that the target data block is being written to the SMR region; or labeling the block metadata of the target data block with a second identifier indicating that the target data block has been written to the SMR region.

In some embodiments, the method may further include updating, in the block metadata of the target data block, a data length of the target data block that has been written to the SMR region.

In some embodiments, the storage information may further include a cyclic redundancy check (CRC) value of the target data for checking an accuracy of the target data.

In some embodiments, the dividing the storage device into the recording region and the SMR region may include formatting the storage device to divide the storage device into the recording region and the SMR region.

In some embodiments, the formatting the storage device may include resetting a position of a write pointer of each of the plurality of zones; storing configuration information of the storage device in the recording region; or establishing a file system in the recording region, the file system being configured to store metadata of the data using a key-value database.

In some embodiments, the method may further include storing, in the recording region, a corresponding relationship between an index of the target data and the target position for retrieving, in the SMR region, the target data.

In some embodiments, the method may further include after the target data is stored in the SMR region, obtaining a request for retrieving the target data, the request including an index of the target data; determining, based on the index of the target data, the target position from the recording region; and retrieving, based on the target position, the target data from the SMR region.

In some embodiments, the recording region may store the storage information using a key-value database.

In some embodiments, the recording region may include a configuration region configured to store configuration information of the storage device, a metadata region configured to store metadata information of the data, and a checking region configured to store checking information of the data.

In some embodiments, the recording region may further include one or more spare regions. The configuration region, the metadata region, and the checking region may be spaced by the one or more spare regions.

In another aspect of the present disclosure, a method for data storage in a storage device is provide. The method may include dividing the storage device into a recording region and a shingled recording (SMR) region; obtaining a processing instruction associated with target data; determining, based on the processing instruction and the storage information, a target position in the SMR region; and processing the target data in the target position. The SMR region may be configured to store data, and the recording region may be configured to store storage information associated with the data. The storage information may include at least a corresponding relationship between an index of the data and a storage location of the data.

In some embodiments, the processing instruction may include storing the target data, and the processing the target data in the target position may include writing the target data in the target position.

In some embodiments, the SMR region may be divided into a plurality of zones each of which is configured to store one or more data blocks in series. The storage information may further include zone information of each of the plurality of zones, the zone information of each of the plurality of zones including an available state of the zone.

In some embodiments, the determining, based on the storage information, the target position in the SMR region may include determining, based on the zone information of each of the plurality of zones, a target zone from the plurality of zones; and determining the target position based on the target zone.

In some embodiments, the method may further include storing, in the recording region, a corresponding relationship between an index of the target data and the target position for retrieving, in the SMR region, the target data.

In some embodiments, the processing instruction may include retrieving the target data, and the processing the target data in the target position may include retrieving, based on the target position, the target data from the SMR region.

In another aspect of the present disclosure, a non-transitory computer readable medium is provided. The non-transitory computer readable medium may include executable instructions that, when executed by at least one processor, direct the at least one processor to perform a method for data storage in a storage device. The method may include dividing the storage device into a recording region and a shingled magnetic recording (SMR) region; obtaining target data to be stored; and determining, based on the target data and the storage information, a target position in the SMR region for storing the target data. The SMR region may be configured to store data, and the recording region may be configured to store storage information associated with the storage device. The storage information may include at least a corresponding relationship between an index of the data and a storage location of the data.

In another aspect of the present disclosure, a non-transitory computer readable medium is provided. The non-transitory computer readable medium may include executable instructions that, when executed by at least one processor, direct the at least one processor to perform a method for data storage in a storage device. The method may include dividing the storage device into a recording region and a shingled recording (SMR) region; obtaining a processing instruction associated with target data; determining, based on the processing instruction and the storage information, a target position in the SMR region; and processing the target data in the target position. The SMR region may be configured to store data, and the recording region may be configured to store storage information associated with the storage device. The storage information may include at least a corresponding relationship between an index of the data and a storage location of the data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
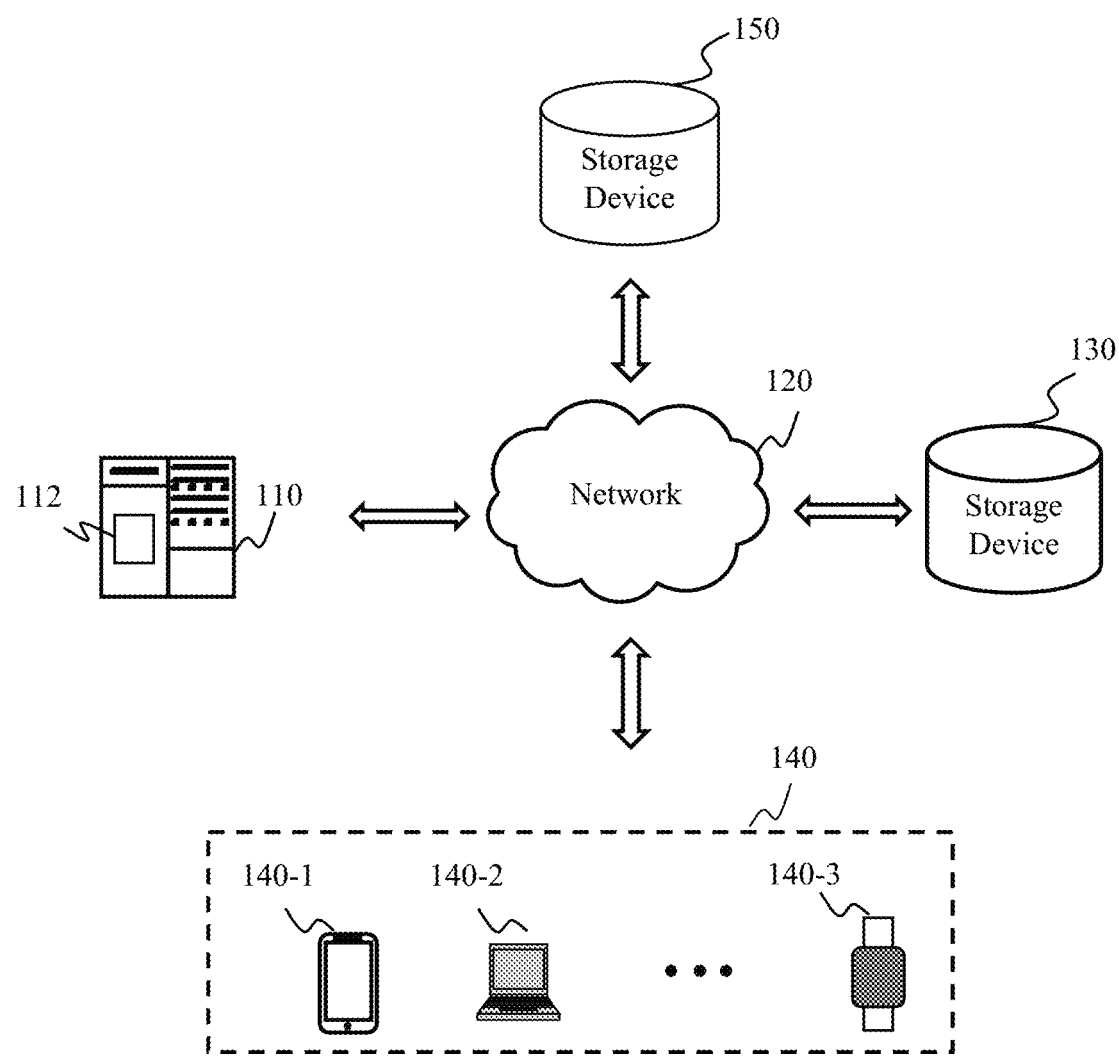
FIG. 1 illustrates a schematic diagram of an exemplary system for data storage according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression(s) if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device(s). In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a system and method for data storage in a storage device (e.g., an SMR disk). The method may include dividing the storage device into a recording region and a shingled magnetic recording (SMR) region (e.g., by formatting the storage device). The SMR region may be only configured to store data. The recording region may be configured to store/record storage information associated with the storage device (e.g., configuration information of the storage device, available space in the storage device, storage information of the data stored in the storage device, etc.). For example, the storage information may include at least a corresponding relationship between an index of the data and a storage location of the data. The method may include obtaining target data to be stored. The method may include determining, based on the target data and the storage information, a target position in the SMR region for storing the target data.

According to some embodiments of the present disclosure, the storage device may be divided into a recording region and a storage region (i.e., the SMR region) by formatting the storage device. The storage region may be configured to store only the data to be stored in the storage device, and the recording region may be configured to store other information associated with the storage device (e.g., the configuration information of the storage device, the available space of the storage device, the storage information of the data, etc.), which can reduce the space waste of the storage region of the storage device, while in the traditional data storage process, the storage region of the storage device without formatting may need to store not only the data to be stored but also a portion of the storage information (e.g., header data) of the data. During the obtaining (or retrieval) of the data from the storage device, the target position associated with where the target data is stored may be directly determined based on the storage information stored in the recording region. Therefore, the data may be obtained based on the target position. According to the function configurations of the recording region and the storage region of the storage device, the storage and/or retrieval efficiency of the storage device is improved.

FIG. 1 illustrates a schematic diagram of an exemplary system for data storage according to some embodiments of the present disclosure. The system for data storage may be applied in various scenarios that need a data storage and/or retrieval in a storage device. As illustrated in FIG. 1, the system 100 for data storage may include a server 110, a network 120, a storage device 130, a terminal device 140, and a storage device 150. As used herein, the storage device 130 and the storage device 150 may refer to two storage devices that are configured to store different data and/or information. For example, the storage device 130 refers to a storage device (e.g., using an SMR technology) that is used for storing target data with large volume, and the storage device 150 refers to a storage device that is used for storing data and/or instructions associated with exemplary methods described in the present disclosure. In some embodiments, the storage device 130 and the storage 150 may be integrated into a single storage device, which is not limited herein.

The server 110 may be a single server or a server group. The server group may be centralized or distributed (e.g., the server 110 may be a distributed system). In some embodiments, the server 110 may be local or remote. For example, the server 110 may access information and/or data stored in the storage device 130, the terminal device 140, and/or the storage device 150 via the network 120. As another example, the server 110 may be directly connected to the storage device 130, the terminal device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image processing to perform one or more functions described in the present disclosure. For example, the processing device 112 may divide a storage device (e.g., the storage device 130) into a recording region and a shingled magnetic recording (SMR) region, e.g., by formatting the storage device 130. The SMR region may be configured to store data, and the recording region may be configured to store storage information associated with the storage device. The storage information may include at least a corresponding relationship between an index of the data and a storage location of the data. As another example, the processing device 112 may obtain a request for processing target data (e.g., target data to be stored or retrieved). In response to the request, the processing device 112 may determine a target position in the SMR region for processing the target data. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the terminal device 140) of the system 100 for data storage. For example, the processing device 112 may be integrated into the terminal device 140 and the functions of the processing device 112 may be implemented by the terminal device 140.

The network 120 may facilitate the exchange of information and/or data for the system 100. In some embodiments, one or more components (e.g., the server 110, the storage device 130, the terminal device 140, the storage device 150) of the system 100 for data storage may transmit information and/or data to other component(s) of the system 100 via the network 120. For example, the server 110 may obtain the request for processing the target data from the terminal device 140 via the network 120. As another example, the server 110 may obtain the target data from the storage device 150 via the network 120. As a further example, the server 110 may transmit the target data to the terminal device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The storage device 130 may include a storage device with a large capacity and high storage density. In some embodiments, the storage device 130 may include a hard disk, e.g., a solid state disk, a disk using a shingled magnetic recording (SMR) technology, a mobile hard disk, a flash card, a mechanical hard disk, an optical disk, etc. For example, the storage device 130 may include an SMR disk with large storage density and/or sequential read/write performance. The SMR disk may include a plurality of data tracks. The plurality of data tracks may be partially overlapped (e.g., like tiles on a roof) for increasing the storage density per unit of the SMR disk. The SMR disk may include an initial recording region and an initial storage region. The initial storage region may include a plurality of zones each of which is configured to store data to be stored. During the traditional data storage process, before the data is written to the initial storage region, header data (which records the index information of the data to be stored) may be generated in a target zone, and the target data may be written to the target zone following the header data. After the data to be stored is written to the initial storage region, tail/end information (which records the data length of the data to be stored) may be generated following the data to be stored in the initial storage region. Accordingly, the initial storage region may need to store not only the data to be stored but also a portion of storage information (e.g., the index information and/or the data length) of the data to be stored, which results in a waste of storage space in the initial storage region and low storage efficiency. In the present disclosure, the storage device 130 (e.g., the SMR disk) may be divided into the recording region and the storage region by formatting the initial recording region and the initial storage region of the storage device 130. After the formatting operation, the storage region (e.g., an SMR region) may be configured to store only the data to be stored in the storage device 130 without storing the storage information of the data to be stored, which can save the storage space in the storage region of the storage device 130 and improve the storage efficiency of the storage device 130. More descriptions regarding the formatting and the dividing of the storage device 130 may be found elsewhere in the present disclosure (e.g., FIGS. 4-7 and relevant descriptions thereof).

In some embodiments, the storage device 130 may be communicatively connected to other components of the system 100 directly or via the network 120. For example, the storage device 130 may be communicatively connected to the server 110 via the network 120. As another example, the storage device 130 may be communicatively connected with the terminal device 140 (e.g., via a connection port) to provide local service for a user (or client). For instance, the user may send the processing instruction associated with the target data via the terminal device 140 (e.g., via an application (e.g., a local application, a browser, an email client, an instant message client, etc.) of the terminal device 140). In response to the processing instruction, the server 110 (or the processing device 112) may determine, based on storage information stored in the recording region of the storage device 130, a target position in the SMR region of the storage device 130 for processing the target data.

The terminal device 140 may be configured to facilitate communication between a user of the system 100 and other components of the system 100. The terminal device 140 may provide a user interface via which the user may view information and/or input data and/or instructions to the system 100 for data storage. For example, the user may input an instruction associated with processing the target data via the user interface. As another example, the terminal device 140 may receive data/information (e.g., the target data) to be stored in the storage device 130 from the server 110 via the network 120. The terminal device 140 may display, via the user interface, the target data received from the server 110 for the user. In some embodiments, the terminal device 140 may include a mobile phone 140-1, a computer 140-2, a wearable device 140-3, or the like, or any combination thereof. In some embodiments, the terminal device 140 may include a display that can display information in a human-readable form, such as text, image, audio, video, graph, animation, or the like, or any combination thereof. The display of the terminal device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the terminal device 140 may be connected to one or more components (e.g., the storage device 130, the server 110, the storage device 150) of the system 100 for data storage via the network 120.

The storage device 150 may be configured to store data and/or instructions. The data and/or instructions may be obtained from, for example, the storage device 130, the server 110, the terminal device 140, and/or any other component of the system 100 for data storage. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the storage device 130, the server 110, the terminal device 140) of the system 100. One or more components of the system 100 may access the data or instructions stored in the storage device 150 via the network 120. In some embodiments, the storage device 150 may be directly connected to or communicate with one or more components (e.g., the storage device 130, the server 110, the terminal device 140) of the system 100. In some embodiments, the storage device 150 may be part of other components (e.g., the storage device 130, the server 110, or the terminal device 140) of the system 100.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more components of the system 100 may be integrated into one component or be omitted. In some embodiments, one or more additional components may be added in the system 100 for data storage. Such variations are within the scope of the present disclosure.

Figure 2:
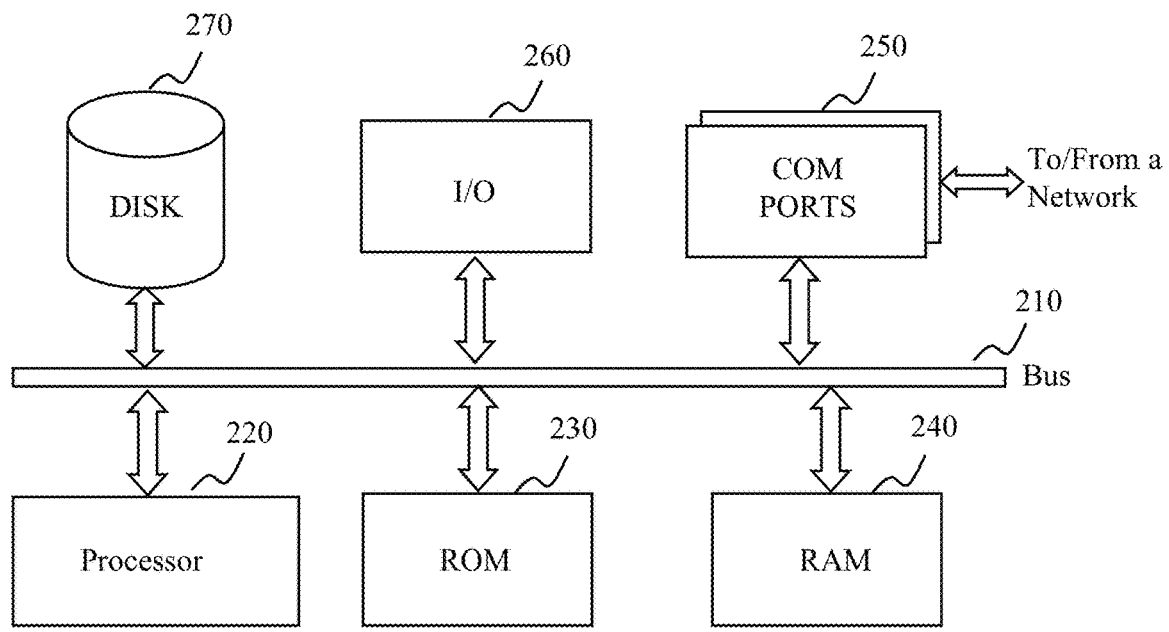
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the system 100 for data storage as described herein. For example, the processing device 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include communication (COM) ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
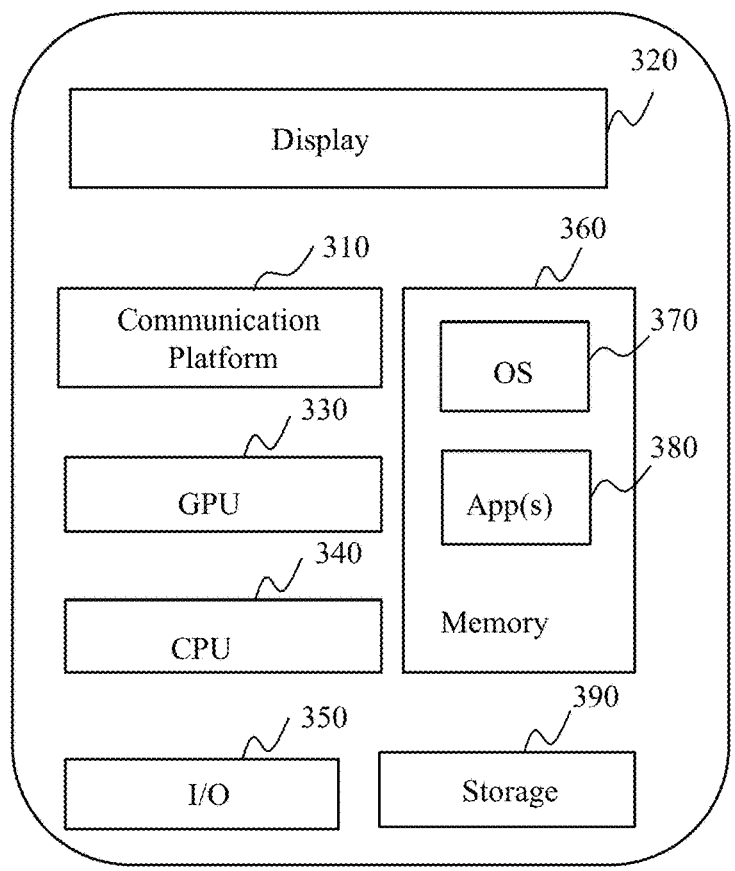
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the terminal device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image processing or other information from the processing device 112. User interactions may be achieved via the I/O 350 and provided to the processing device 112 and/or other components of the system 100 for data storage via the network 120.

FIGS. 4-7 are schematic diagrams illustrating exemplary divisions of a storage device according to some embodiments of the present disclosure. The storage devices 400-700 as shown in FIGS. 4-7 may be exemplary embodiments of the storage device 130 as described in FIG. 1. As shown in FIGS. 4-7, the storage device 400-700 may be divided to or include a recording region (e.g., a conventional magnetic recording (CMR) region) and a storage region (e.g., an SMR region).

Figure 4:
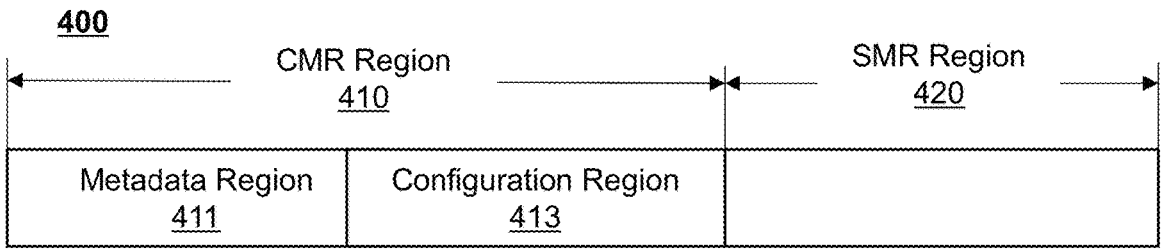
FIGS. 4-7 are schematic diagrams illustrating exemplary divisions of a storage device according to some embodiments of the present disclosure.

As shown in FIG. 4, the storage device 400 may be divided to or include a CMR region 410 and an SMR region 420. The SMR region 420 may be configured to only store data without other information. The CMR region 410 may be configured to store storage information associated with the storage device 400. The storage information associated with the storage device 400 may include configuration information of the storage device 400, storage information of data stored in the storage device 400, etc. The configuration information of the storage device 400 may include static information of the storage device 400, e.g., the storage capacity of the storage device 400, the size of each region of the storage device 400, the position of each region in the storage device 400, etc., which can facilitate indexing each region of the storage device 400. The storage information of the data stored in the storage device 400 may include metadata information (e.g., an index (e.g., a file identifier) and a property including a data length, a storage location (e.g., reflected by a start offset), creation time, etc.) of the data stored in the storage device 400. The creation time of the data may indicate a time when the data is written to the SMR region. In some embodiments, the CMR region 410 may be further divided into a metadata region 411 and a configuration region 413. The metadata region 411 may be configured to store the metadata information of the data stored in the storage device 400. The configuration region 413 may be configured to store the configuration information of the storage device 400.

Figure 5:
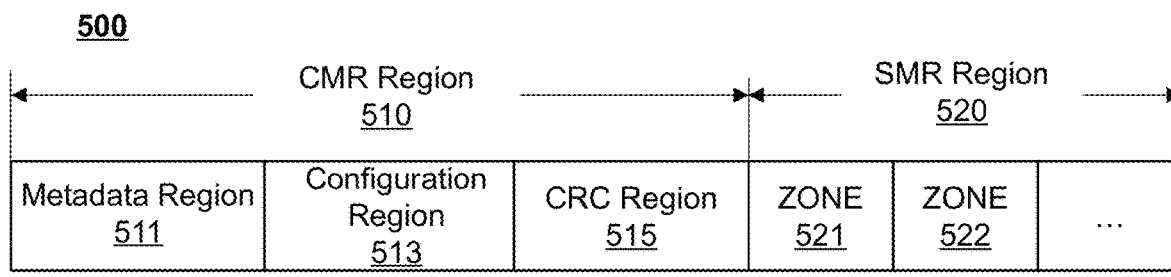

As shown in FIG. 5, the storage device 500 may be divided into a CMR region 510 and an SMR region 520. The SMR region 520 may be configured to only store data without other information. In some embodiments, the SMR region 520 may further be divided into a plurality of storage units (e.g., zones 521, 522 . . . ). Each of the plurality of zones may be configured to store data or a portion thereof. For example, the data to be stored may consist of one or more data blocks. As used herein, a data block refers to a minimum storage unit of the data. The data blocks may be stored in the same zone or different zones of the SMR region 520. In some embodiments, the SMR region 520 may be divided into the plurality of zones evenly or unevenly (e.g., according to actual storage needs). That is, a size (e.g., a storage capacity) of each of the plurality of zones may be the same or different. Merely by way of example, each of the plurality of zones may have a storage capacity of 256 MB. As another example, the zone 521 may have a first storage capacity, and the zone 522 may have a second storage capacity different from the first storage capacity. In some embodiments, each of the plurality of zones may include a write pointer (WP) based on which data is written to and/or read from the zone. For example, for a specific zone, data may be written to the specific zone sequentially from the position of a write pointer of the specific zone. That is, data cannot be written to the zone randomly. For instance, one or more data blocks of the data may be written to the specific zone in series from the position of the write pointer of the specific zone. As another example, data after the write pointer of the specific zone cannot be read from the specific zone. That is, only data before the write pointer of the specific zone can be read from the specific zone.

The CMR region 510 may be configured to store storage information of the storage device 400. The storage information of the storage device 500 may include configuration information of the storage device 500, storage information of the data stored in the storage device 500, checking information of the data stored in the storage device 500, etc. The configuration information of the storage device 500 may include static information of the storage device 500, e.g., a storage capacity of the storage device 500, a size of each region of the storage device 500, a position of each region in the storage device 500, etc. The storage information of the data stored in the storage device 400 may include metadata information (e.g., an index and a property including a data length, a storage location, etc.) of the data (and/or data blocks thereof) stored in the storage device 500 and/or zone metadata of each of the plurality of zones. The zone metadata of each of the plurality of zones may include an index of the zone (e.g., which specifies the zone among the plurality of zones and/or specifies an available state of the zone), and a property of the zone (e.g., including an offset of a write pointer of the zone in the zone, a count of data blocks that has been written to the zone, a data length of data blocks that has been written to the zone, an identifier indicating the available state of the zone, or the like, or any combination thereof). The offset of the write pointer of the zone may be represented by a data length of data blocks that have been written to the zone. In some embodiments, the CMR region 510 may store the storage information associated with the storage device 500 using a key-value database or storage engine (e.g., RocksDB). The key-value database may include keys and corresponding values. For example, for the metadata information of the target data, the key-value database may include a key configured to store the index of the target data, and a value configured to store the property of the target data. As another example, for the zone metadata of a zone, the key-value database may include a key configured to store the index of the zone, and a value configured to store the property of the zone. More descriptions regarding the key-value database may be found elsewhere in the present disclosure (e.g., FIG. 12 and relevant descriptions thereof). The checking information of the data stored in the storage device 500 may include cyclic redundancy check (CRC) value(s) of the data stored in the storage device 500 for checking the accuracy of the data. The CRC value(s) of the data may be used to detect or verify errors of the data that occur after the data is transmitted or stored.

In some embodiments, the CMR region 410 may be further divided into a metadata region 511, a configuration region 513, and a CRC region 515. The metadata region 511 may be configured to store the metadata information of the data stored in the storage device 500. The configuration region 513 may be configured to store the configuration information of the storage device 500. The CRC region 515 may be configured to store the checking information of the data stored in the storage device 500. In such cases, the configuration information of the storage device 500 may include the storage capacity of the storage device 500, the storage capacity of each region (e.g., the metadata region 511, the configuration region 513, the CRC region 511, the zone 521, the zone 522, etc.), a location (e.g., a start location) of each region (e.g., the metadata region 511, the configuration region 513, the CRC region 511, the zone 521, the zone 522, etc.) in the storage device 500, zone information of the plurality of zones (e.g., a total count (the number) of the plurality of zones, an available state of each of the plurality of zones, a count (the number) of zones with different available states, etc.), or any combinations thereof. The available state of a zone may include a free state, a used state, or a partially-used state. The count of zones with different available states may include a count of free zones, a count of used zones, a count of partially-used zones, or the like, or any combination thereof. As used herein, a free zone refers to a zone that is not used; a used zone refers to a zone that has been used and has no storage space; and a partially-used zone refers to a zone that has been used partially and still has a storage space.

Figure 6:
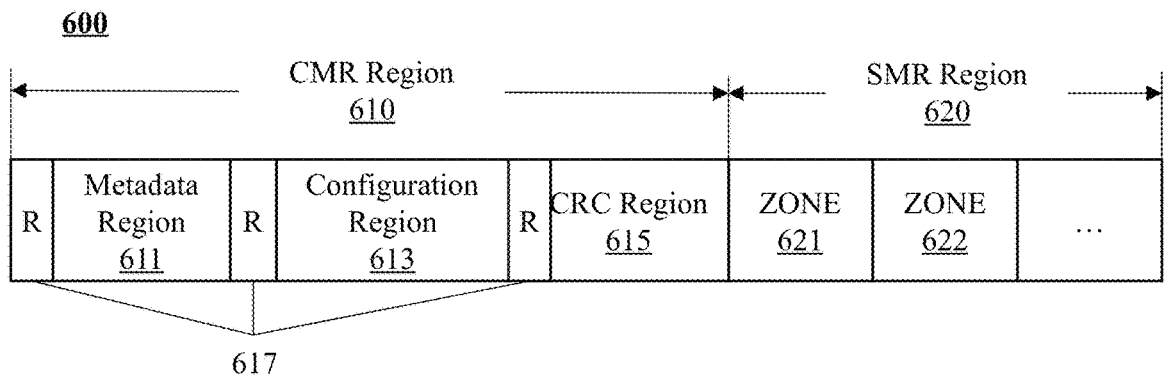

As shown in FIG. 6, the storage device 600 may be divided into a CMR region 610 and an SMR region 620. The SMR region 620 may be configured to only store data without other information. The SMR 620, similar to the SMR region 520, may include a plurality of zones (e.g., 621, 622 . . . ). The CMR region 610 may include a metadata region 611, a configuration region 613, and a CRC region 615, which are similar to the metadata region 511, the configuration region 513, and the CRC region 515 of the CMR region 510, respectively. In addition, the CMR region 610 may include one or more spare regions (denoted by R and 617 in FIG. 6). As used herein, a spare region may be a blank region. The spare region may be used to expand a storage capacity of a region (e.g., the metadata region 611, the configuration region 613, or the CRC region 615) that is adjacent to the spare region according to actual storage needs. Alternatively, the spare region may be used to increase the count of regions in CMR region 610. In some embodiments, the metadata region 611, the configuration region 613, the CRC region 615, and the one or more spare regions 617 may be arranged at intervals. For example, the metadata region 611, the configuration region 613, and/or the CRC region 615 may be spaced by the one or more spare regions 617. As illustrated, the metadata region 611 and the configuration region 613 are spaced by a spare region 617; the configuration region 613 and the CRC region 615 are spaced by another spare region 617; and there is an additional spare region 617 before the metadata region 611.

Figure 7:
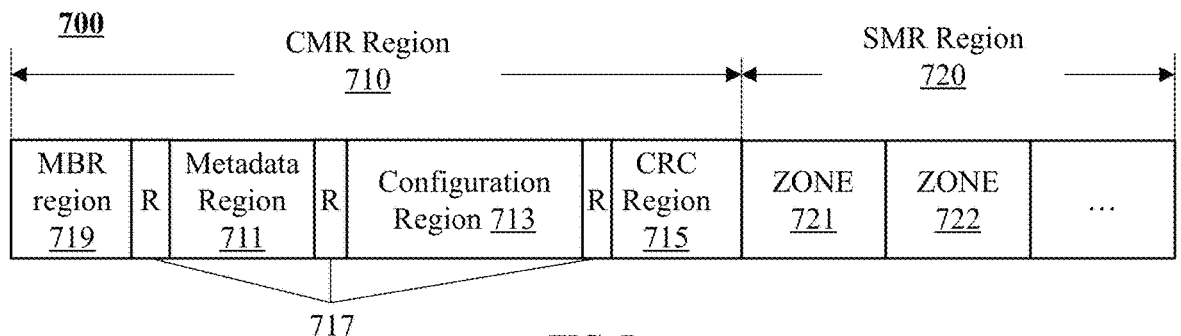

As shown in FIG. 7, the storage device 700 may be divided into a CMR region 710 and an SMR region 720. The SMR region 720 may be configured to only store data without other information. The SMR 720, similar to the SMR region 520 or 620, may include a plurality of zones (e.g., 621, 622 . . . ). The CMR region 710 may include a metadata region 711, a configuration region 713, a CRC region 715, and one or more spare regions (denoted by R) 717, which are similar to the metadata region 611, the configuration region 613, and the CRC region 615, and the one or more spare regions 617 of the CMR region 610, respectively. In addition, the CMR region 710 may include a master boot record (MBR) region 719. The MBR region 719 may be arranged as a first region (e.g., before all regions) or beginning region in the CMR region 710. The MBR region 719 may be configured to store/record a boot loader of the storage device 700 and/or a partition table of the storage device 700.

In some embodiments, different regions of the CMR region 410, 510, 610, and 710 may be arranged in different orders, and FIGS. 4-7 are exemplary arrangements of the different partitions (i.e., regions). According to the configuration of different regions of a CMR region of a storage device to store different information, especially the configuration of a configuration region of the CMR region to store configuration information of the storage device, a certain region in the storage device can be identified based on the configuration information. In such cases, the storage device can be compatible no matter how many divided regions are added, expanded, or reduced due to subsequent storage device upgrades (i.e., the changes in the number, the size, and/or the location of divided regions of the storage device), which improves the compatibility of the storage device.

It should be noted that the above descriptions of the storage devices 400-700 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, the SMR region 520, 620, or 720 may also include one or more spare units (not shown). As used herein, a spare unit refers to a blank region in the SMR region 520, 620, or 720. The spare unit may be used as a storage unit or expand a storage capacity of a storage unit that is arranged adjacent to the standby unit according to actual storage needs. Alternatively, the spare unit may be configured to prepare for possible remapped sectors of the storage units and/or backup corresponding configuration region (e.g., the configuration region 513, 613, or 713). In such cases, a total count of the used zones, the free zones, and the free zones may be less than the total count of the plurality of storage units and the one or more spare units. In some embodiments, the configuration region and the metadata region of a storage device may be a same region that can store all information in the configuration region and the metadata region.

Figure 8:
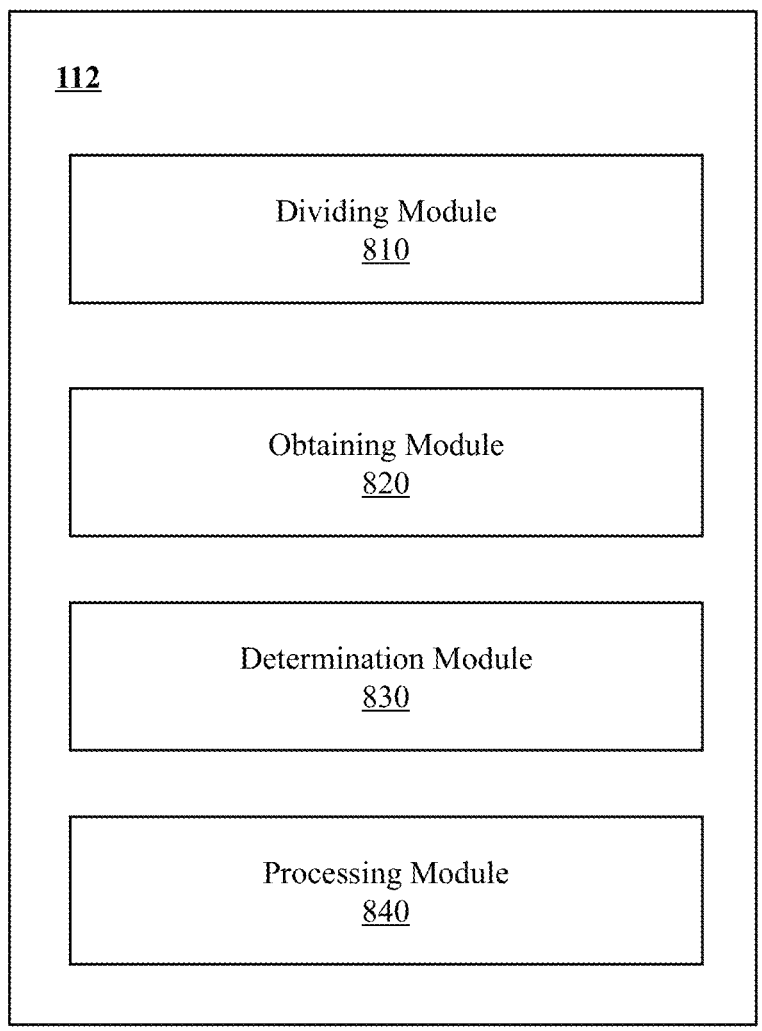
FIG. 8 is a schematic diagram illustrating an exemplary processing device according to some embodiments of the present disclosure.

FIG. 8 is a schematic diagram illustrating an exemplary processing device according to some embodiments of the present disclosure. As shown, the processing device 112 may include a dividing module 810, an obtaining module 820, a determination module 830, and a processing module 840.

The dividing module 810 may be configured to divide a storage device (e.g., the storage device 130) into a plurality of regions. For example, the dividing region 810 may divide the storage device 130 into a recording region and an SMR region. The recording region may include a configuration region, a metadata region, a checking region (e.g., a CRC region), etc. The SMR region may include a plurality of storage units (e.g., zones). In some embodiments, the dividing module 810 may divide the storage device into the plurality of regions by formatting the storage device 130. More descriptions regarding the division of the storage device 130 and the plurality of regions of the storage device 130 may be found elsewhere in the present disclosure (e.g., FIGS. 4-7, operation 910 in FIG. 9, FIG. 12 and relevant descriptions thereof).

The obtaining module 820 may be configured to obtain data and/or information from one or more components of the system 100. For example, the obtaining module 810 may obtain a processing instruction associated with target data from, e.g., the terminal device 140. The processing instruction may include storing the target data in storage device 130, retrieving the target data from storage device 130, deleting the target data in storage device 130, etc. As another example, the obtaining module 810 may obtain the target data from, e.g., the terminal device 140 or the storage device 150. More descriptions regarding the obtaining the processing instruction and/or the target data may be found elsewhere in the present disclosure (e.g., operation 920 in FIG. 9, operation 1310 in FIG. 13, and relevant descriptions thereof).

The determination module 830 may be configured to determine a target position in the storage device 130 associated with the target data. For example, the determination module 830 may determine, based on the target data and storage information in the recording region, the target position in the SMR region for storing the target data. As another example, the determination module 830 may determine, based on the processing instruction and the storage information in the recording region, a target position in an SMR region of the storage device for processing the target data. More descriptions regarding the determination of the target position may be found elsewhere in the present disclosure (e.g., operation 930 in FIG. 9, operation 1320 in FIG. 13, and relevant descriptions thereof).

The processing module 840 may be configured to process the target data in the storage device 130 based on the target positon. For example, the processing module 840 may store the target data in the SMR region based on the target position. As another example, the processing module 840 may retrieve or obtain the target data from the SMR region based on the target position. As still another example, the processing module 840 may delete the target data in the SMR region. More descriptions regarding the processing of the target data based on the target position may be found elsewhere in the present disclosure (e.g., operation 940 in FIG. 9, operations 1330-1350 in FIG. 13, and relevant descriptions thereof).

It should be noted that the above descriptions of the processing device 112 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules (or units) may be combined into a single module (or unit), and any one of the modules may be divided into two or more units. For example, the determination module 830 and the processing module 840 may be integrated into a single module. In some embodiments, one or more of the modules mentioned above may be omitted and/or one or more additional modules may be added in the processing device 112. For example, the processing device 112 may further include a storage module.

As another example, the storage device may be pre-divided and the dividing module 810 may be omitted.

Figure 9:
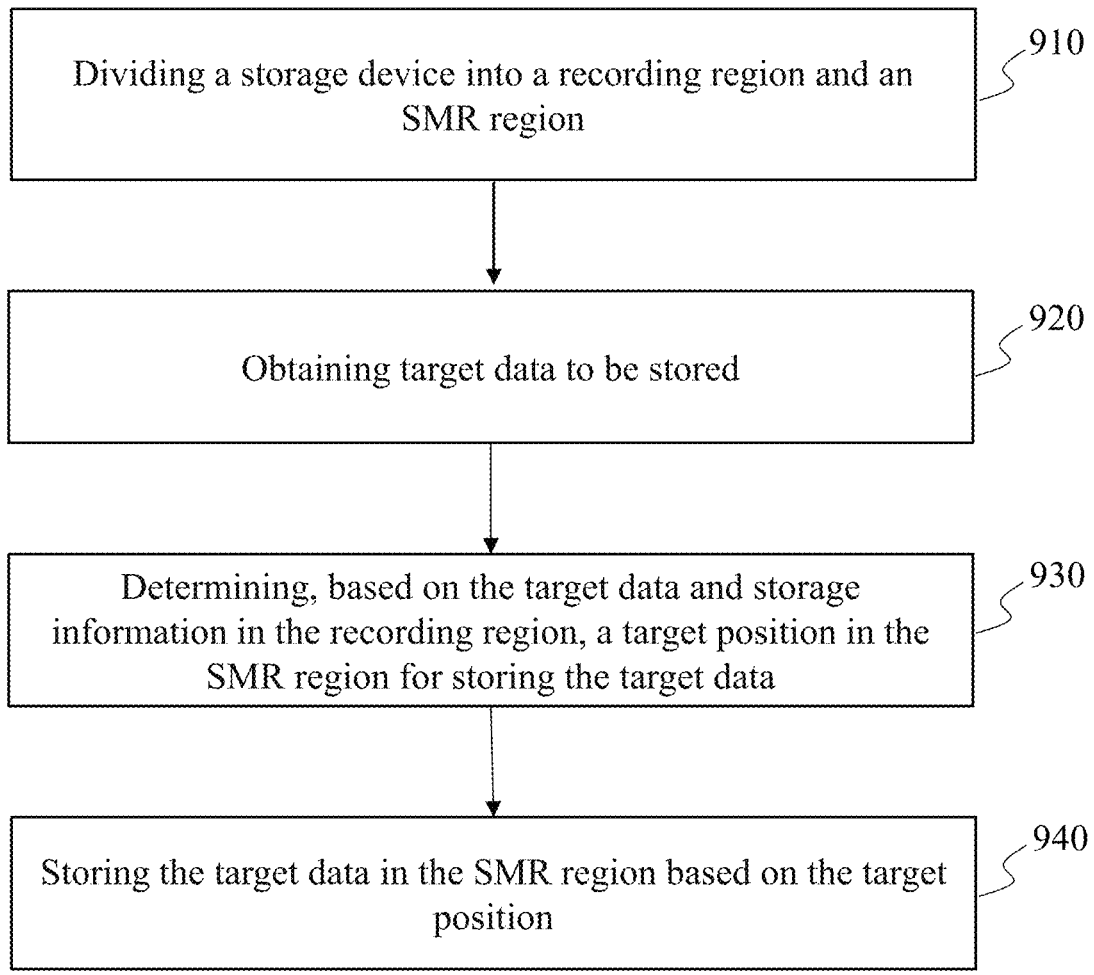
FIG. 9 is a flowchart of an exemplary process for data storage according to some embodiments of the present disclosure.

FIG. 9 is a flowchart of an exemplary process for data storage according to some embodiments of the present disclosure. In some embodiments, one or more operations in the process 900 may be implemented in the system 100 for data storage illustrated in FIG. 1. For example, one or more operations in the process 900 may be stored in a storage device (e.g., the storage device 150, the ROM 230, the RAM 240, and/or the storage 390) as a form of instructions, and invoked and/or executed by a processing device 112 (e.g., the processor 220, the CPU 340, and/or one or more modules illustrated FIG. 8). The operations of the illustrated process presented below are intended to be illustrative. In some embodiments, the process may be accomplished with one or more additional operations not described, and/or without one or more of the operations discussed. Additionally, the order in which the operations of the process 900 as illustrated in FIG. 9 and described below is not intended to be limiting.

In 910, the processing device 112 (e.g., the dividing module 810) may divide a storage device (e.g., the storage device 130, 400, 500, 600, or 700) into a recording region and an SMR region.

As described in FIG. 1, the storage device 130 may be a storage device with large storage capacity, high density, and/or sequential read/write performance. For example, the storage device 130 may include an SMR disk.

In some embodiments, the divided regions of the storage device 130 may be configured to store different information associated with the storage device 130 and/or data stored in the storage device 130. For example, the SMR region may be configured to only store the data (e.g., video data, image data, file data, etc.). The recording region may be configured to store storage information associated with the storage device 130. The storage information associated with the storage device 130 may include configuration information of the storage device 130, storage information of the data stored in the storage device 130, etc. For example, the storage information of the data stored in the storage device 130 may include at least a corresponding relationship between an index of the data and a storage location of the data. In some embodiments, the SMR region may further be divided into a plurality of zones. The recording region may further be divided into a metadata region, a configuration region, a checking region (e.g., a CRC region), one or more spare regions, or the like, or any combination thereof. The metadata region may be configured to store the storage capacity of the storage device 130 and regions thereof, the location of the regions of the storage device 130 in the storage device, zone information of each of the plurality of zones, or the like, or any combination thereof. The metadata region may be configured to store metadata information (e.g., block metadata) of the data stored in the storage device 130, zone metadata of each of the plurality of zones, etc. The CRC region may be configured to store checking information (e.g., CRC values) of the data stored in the storage device 130. More descriptions regarding the storage information associated with the storage device 130, and the dividing of storage device 130 may be found elsewhere in the present disclosure (e.g., FIGS. 4-7 and relevant descriptions thereof). In some embodiments, a storage capacity of the recording region may be far less than a storage capacity of the SMR region. That is, the SMR region occupies a large part of the storage capacity of the storage device 130.

Figure 12:
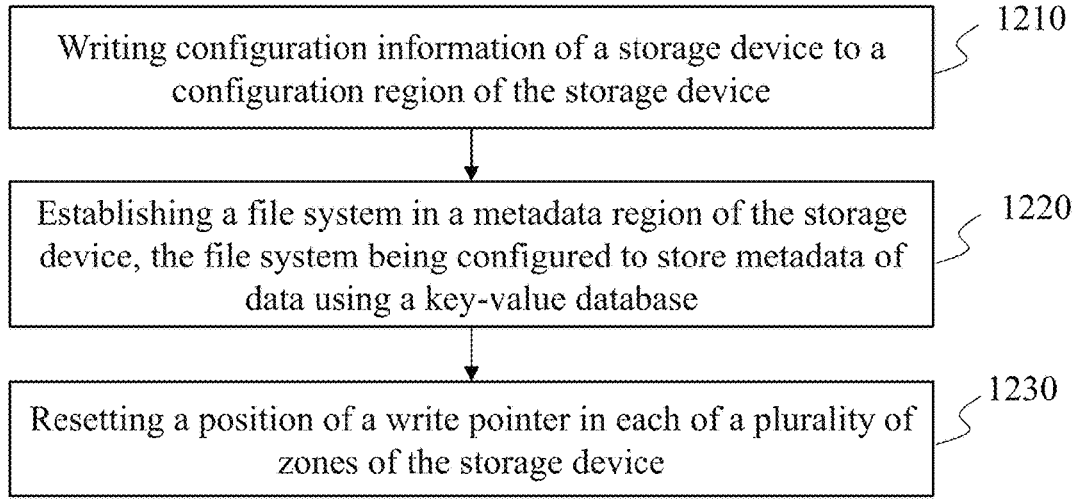
FIG. 12 is a flowchart of an exemplary process for formatting a storage device according to some embodiments of the present disclosure.

In some embodiments, the processing device 112 may divide the storage device into the recording region and the SMR region by formatting the storage device 130. As used herein, the formatting of the storage device 130 refers to initializing the storage device 130 according to which data and/or partitions (e.g., divided regions) of the storage device 130 would be erased. FIG. 12 illustrates an exemplary formatting process according to some embodiments of the present disclosure. The formatting process may start (or be triggered) in response to a dividing instruction from a user, a request for data storage, etc. Alternatively, the formatting process may be triggered when the storage device 130 (e.g., an SMR disk) is communicatively connected with the processing device 112 for the first time. During the formatting process, the storage device 130 may be repartitioned (e.g. divided) and/or reset, and different portions of the storage information associated with the repartitioned storage device 130 may be written to corresponding partitions (e.g., regions) of the repartitioned storage device 130. More descriptions regarding the formatting process may be found elsewhere in the present disclosure (e.g., FIG. 12 and the description thereof).

In 920, the processing device 112 (e.g., the obtaining module 820) may obtain target data to be stored.

In some embodiments, the target data to be stored may include video data, image data, file data, or the like, or any combination thereof. For instance, the target data may include monitoring data of a target acquired by a camera device. In some embodiments, the target data may include (or consist of) one or more target data blocks to be stored.

In some embodiments, the processing device 112 may receive the target data directly from one or more components of the system 100. For example, the processing device 112 may receive the target data from the terminal device 140 or the storage device 150. In some embodiments, the processing device 112 may receive a request/processing instruction associated with the target data. The processing device 112 may retrieve the target data from the storage device 150 in response to the request/processing instruction. Alternatively, the request/processing instruction may include the target data, and the processing device 112 may parse the target data from the request/processing instruction.

In 930, the processing device 112 (e.g., the determination module 830) may determine, based on the target data and the storage information, a target position in the SMR region for storing the target data.

In some embodiments, the processing device 112 may determine, based on the target data and the zone information of each of the plurality of zones, a target zone from the plurality of zones. For example, the processing device 112 may determine, based on the target data and the zone information, one or more candidate zones from the plurality of zones. An available storage capacity of each of the one or more candidate zones may be larger than a size of the target data (or one or more target blocks thereof). The processing device 112 may determine one or more target zones from the one or more candidate zones. That is, the target data may be stored in the same or different target zones (e.g., a portion of the target data being written to a first target zone, and another portion of the target data being written to a second target zone). A target zone may be a zone with equal available storage capacity to the size of the target data (or the one or more target data blocks thereof) among the one or more candidate zones. For instance, the processing device 112 may determine free zones and partially-used zones of the plurality of zones based on the zone information of each of the plurality of zones. The processing device 112 may determine the one or more candidate zones from the free zones and the partially-used zones. The processing device 112 may rank the one or more candidate zones according to storage capacities thereof in an ascending or descending order. The processing device 112 may determine the target zone from the one or more candidate zones based on the ranking result.

Figure 10:
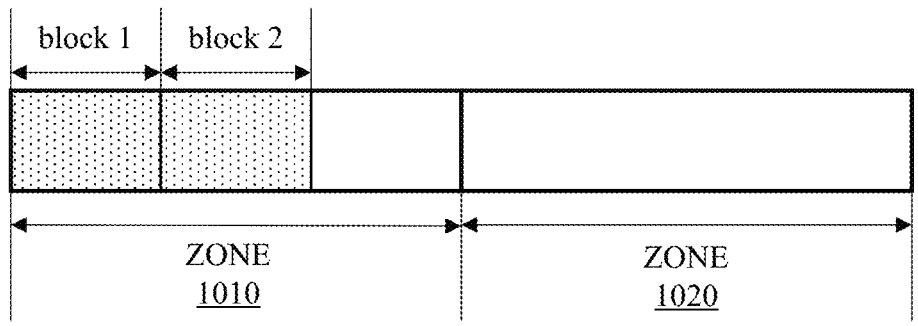
FIG. 10 is a schematic diagram illustrating exemplary target zones and target data according to some embodiments of the present disclosure.
Figure 11:
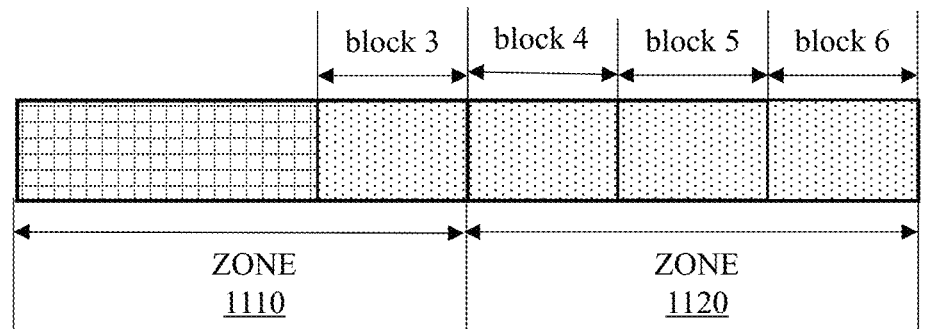
FIG. 11 is a schematic diagram illustrating exemplary target zones and target data according to some embodiments of the present disclosure.

In some embodiments, for the target data including one target data block, the processing device 112 may determine whether a size of the target data block of the target data is greater than a preset block size (e.g., 100 M). In response to determining that the size of the target data block is less than the preset block size, the processing device 112 may determine a target zone from partially-used zones of the plurality of zones for storing the target data block. In response to determining that the size of the target data block is greater than the preset block size, the processing device 112 may determine a target zone from free zones of the plurality of zones for storing the target data block. In some embodiments, for the target data including more than one target data block, the processing device 112 may determine one or more target zones. That is, the target data may be stored in a same zone or different zones. For example, if the size of the target data (e.g., including block 1 and block 2 as shown in FIG. 10) is less than the storage capacity of a zone (e.g., a free zone), the target data blocks (e.g., the block 1 and the block 2 as shown in FIG. 10) of the target data may be stored in the same target zone (e.g., a target zone 1010 as shown in FIG. 10) in series. As another example, if the size of the target data is greater than the storage capacity of a zone (e.g., a free zone), a first count of the target data blocks of the target data may be stored in a first target zone and a second count of the target data blocks of the target data may be stored in a second target zone. The first target zone and the second target zone may be adjacent or not. For illustration purposes, as shown in FIG. 11, the target data may include block 3, block 4, block 5, and block 6, and the size of the target data is greater than the storage capacity of a zone (e.g., a free zone). The block 3 is stored in a target zone 1110 which is a partially-used zone (e.g., an available storage capacity of which is equal to the size of the block 3), and the block 4, the block 5, and the block 6 are stored in a target zone 1120 which is a free zone.

In some embodiments, the processing device 112 may obtain the metadata information stored in the metadata region. The processing device 112 may obtain indexes of the free zones, the used zones, and the partially-used zones. For example, the storage device 130 may be trigged (also referred to as on line) in response to obtaining the target data to be stored or receiving a processing instruction associated with the target data. The processing device 112 may obtain/read the metadata region of the recording region and mount the metadata region (e.g., a file system thereof) to a preset directory of the system 100. In some embodiments, processing device 112 may detect whether the storage device 130 is an SMR disk. In response to determining that the storage device 130 is an SMR disk, the processing device 112 may read the metadata information (zone metadata of each of the plurality of zones) in the metadata region by reading the key-value database and/or the file system of the metadata region. The processing device 112 may determine, based on the zone metadata of each of the plurality of zones, the free zones, the used zones, and/or the partially-used zones from the plurality of zones. The zone metadata of each of the plurality of zones may include an index of each zone (which specifies the zone among the plurality of zones and indicates an available state of the zone) and a property of each zone (e.g., including a position of a write pointer, etc.). More descriptions regarding the zone metadata may be found elsewhere in the present disclosure (e.g., FIGS. 4-7 and relevant descriptions thereof).

Further, the processing device 112 may determine the target position based on the target zone. For example, the processing device 112 may determine a location (e.g., an offset) of the target zone in the storage device 130 based on zone information of the target zone stored in the configuration region. The processing device 112 may determine a position (e.g., an offset) of a write pointer of the target zone in the target zone based on zone metadata of the target zone stored in the metadata region. The processing device 112 may determine the target position based on the offset of the target zone in the storage device 130 and the offset of the write pointer in the target zone. For instance, the target position may be a location (or offset) of the write pointer in the storage device 130. That is, the processing device 112 may determine a relative position/location of the write pointer in the storage device 130 as the target position.

In some embodiments, before writing the target data in the target zone, the processing device 112 may correct the position of the write pointer of the target zone. For example, the processing device 112 may obtain the position of the write pointer of the target zone based on the zone metadata of the target zone. The processing device 112 may obtain an actual position of the write pointer in the target zone. The processing device 112 may correct the position of the write pointer based on the actual position of the target zone. For instance, the processing device 112 may directly replace the position of the write pointer recorded in the zone metadata of the target zone with the actual position of the write pointer. Alternatively, the processing device 112 may determine whether a difference between the position of the write pointer and the actual position of the write pointer is less than a threshold difference. In response to determining that the difference between the position of the write pointer and the actual position of the write pointer is less than or equal to the threshold difference, the processing device 112 may keep the position of the write pointer recorded in the zone metadata of the target zone. In response to determining that the difference between the position of the write pointer and the actual position of the write pointer is greater than the threshold difference, the processing device 112 may directly replace the position of the write pointer recorded in the zone metadata of the target zone by the actual position of the write pointer. Further, the processing device 112 may determine the target position based on the location of the target zone in the storage device 130 and the corrected position of the write pointer in the target zone.

In some embodiments, the inconsistency of the position of the write pointer and the actual position of the write pointer may be caused by one or more factors. For example, during the data writing process, the data writing may occur to be terminated as a write error and/or an abnormal write. In such cases, the actual position (e.g., an offset) of the write pointer may be greater than the position of the write pointer recorded in the zone metadata of the target zone. That is, the actual position (e.g., an offset) of the write pointer may be inconsistent with the position of the write pointer recorded in the zone metadata of the target zone. In some embodiments, the processing device 112 may correct the position of the write pointer of the target zone when the storage device 130 is on line.

In 940, the processing device 112 (e.g., the processing device 840) may store the target data in the SMR region based on the target position.

In some embodiments, the processing device 112 may write the target data to the SMR region based on the target position. For example, the processing device 112 may write the target data from the position of the writer pointer of the target zone corresponding to the target position in the SMR region. In some embodiments, the processing device 112 may check the accuracy of the target data before writing the target data in the SMR region. For example, the processing device 112 may determine CRC value(s) of the target data based on the target data. The processing device 112 may check the accuracy of the target data based on the CRC value(s). In some embodiments, during, before, and/or after the target data is written to the SMR region, the processing device 112 may write and/or update the block metadata of the target data to the recording region (e.g., the metadata region) of the storage device.

In some embodiments, the block metadata of the target data may include block metadata of each of the one or more target data blocks. For a target data block, the metadata block of the target data block may include an index of the target data, an index of the target data block (which specifies the target data block among the one or more target data blocks), and a property of the target data block including a size (e.g., a data length) of the target data block, an identifier indicating a storage state (e.g., is being written or has been written) of the target data block, a data length of the target data block that has been written to the SMR region, a corresponding relationship between the index of the target data block and a target position corresponding to the target data block, the creation time of the target data block, or the like, or any combination thereof. For example, when the target data block is being written to the SMR region, the processing device 112 may label the block metadata with a first identifier (e.g., a prefix of "W") indicating that the target data block of the target data is being written to the SMR region. As another example, after the target data block has been written to the SMR region, the processing device 112 may label the block metadata with a second identifier (e.g., a prefix of "C") indicating that the target data block has been written to the SMR region. As still another example, during the target data block is being written to the SMR region, the processing device 112 may update, in the block metadata of the target data block, a data length of the target data block that has been written to the SMR region. The processing device 112 may determine/record a count of the one or more target blocks that have been written to the SMR region based on one or more block metadata of the one or more target data blocks. As further another example, after or when the target data block is written to the SMR region, the processing device 112 may store a corresponding relationship between the index of the target data block and a target position corresponding to the target data block for subsequently retrieving, in the SMR region, the target data block. As a further example, after the target data block is written to the SMR region, the processing device 112 may store/record a position of the write pointer of the target zone (that stores the target data block) in the zone metadata of the target zone for subsequent writing or reading data from the target zone.

In some embodiments, after the target data is stored in the SMR region, the processing device 112 may obtain a request for retrieving the target data. The request may include at least an index of the target data. The processing device 112 may determine, based on the index of the target data, the target position corresponding to the target data from the recording region. For instance, the processing device 112 may obtain, based on the index of the target data, the corresponding relationship between the index of the target data and the target position in the block metadata of the target data. The processing device 112 may retrieve, based on the target position, the target data from the SMR region. More descriptions regarding the retrieval of the target data may be found elsewhere in the present disclosure (e.g., FIG. 13 and relevant descriptions thereof).

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added to the process 900 and/or one or more operations of the process 900 described above may be omitted. For example, operation 910 may be omitted. That is, the storage device 130 may be pre-formatted to include the recording region and the SMR region. The processing device 112 may directly obtain/connect the formatted storage device 130 and perform data storage in the formatted storage device 130.

FIG. 12 is a flowchart of an exemplary process for formatting a storage device according to some embodiments of the present disclosure. In some embodiments, one or more operations in the process 1200 may be implemented by the processing device 112 of the system 100 for data storage. For example, one or more operations in the process 1200 may be stored in a storage device (e.g., the storage device 150, the ROM 230, the RAM 240, and/or the storage 390) as a form of instructions, and invoked and/or executed by a processing device 112 (e.g., the processor 220, the CPU 340, and/or the dividing module 810 illustrated FIG. 8) of the system 100. In some embodiments, the process 1200 may be implemented by a processing device of a third part (e.g., a vendor or manufacturer of the storage device 130). In some embodiments, at least a portion of the operation 910 in FIG. 9 may be achieved by operations of the process 1200. During the formatting of the storage device, at least operations 1210, 1220, and 1230 of the process 1200 may be performed.

In 1210, the processing device 112 (e.g., the dividing module 810) may write configuration information of the storage device (e.g., the storage device 130) to a configuration region of the storage device.

In some embodiments, the configuration information of the storage device 130 may include a storage capacity of the storage device 130, a storage capacity of each region of the storage device 130, a location (e.g., an offset) of each region in the storage device 130, zone information of a plurality of zones in an SMR region of the storage device 130, or any combinations thereof. More descriptions regarding the configuration information of the storage device 130 may be found elsewhere in the present disclosure (e.g., FIGS. 4-7 and relevant descriptions thereof).

In 1220, the processing device 112 (e.g., the dividing module 810) may establish a file system in a metadata region of the storage device.

In some embodiments, the file system may be configured to store metadata of data stored in the storage device 130. In some embodiments, the file system may include an XFS file system which is a log file system with high performance. The XFS file system may be divided into a plurality of allocation groups which are equal-length linear storage areas of the file system. Each allocation group manages its inodes and free space. Files and/or folders can span allocation groups. This mechanism provides the XFS file system scalability and parallelism (e.g., multiple threads and processes can perform I/O operations in parallel on the same file system simultaneously).

In some embodiments, the file system may store metadata information of the data stored in the storage device 130 and/or zone metadata of each of the plurality of zones of the storage device 130 using a key-value database. For example, the key-value database may include RocksDB. The key-value database may include keys and values. For example, a key may be configured to store an index of the data stored in the storage device 130, and a value may be configured to store a property of the data stored in the storage device 130. As another example, a key may be configured to store an index of a zone of the storage device 130, and a value may be configured to store a property of the zone. More descriptions regarding the index of the data or the zone and the property of the data or the zone may be found elsewhere in the present disclosure (e.g., FIGS. 4-7 and relevant descriptions thereof).

In some embodiments, by establishing the file system in the metadata region, the metadata information of the data and/or each of the plurality of zones may be stored in the file system using the key-value database. According to the file system using the key-value database, the metadata region can store the metadata information with a larger size than indexes of data blocks of the data stored in the storage device 130. In this way, it may avoid or reduce insufficient storage space of the metadata region, which in turn reduces or avoids deleting indexes caused by insufficient storage space of the storage device 130. In addition, the file system using the Key-Value database (such as RocksDB) can ensure the consistency of updated metadata information, thus ensuring the consistency of metadata information in the metadata region. Further, in comparison with common relational databases, the key-value database may have faster reading and writing speed, which improves the storage efficiency of the storage device 130.

In 1230, the processing device 112 (e.g., the dividing module 810) may reset a position or location (e.g., an offset) of a write pointer in each of the plurality of zones of the storage device.

During formatting the storage device 130, the processing device 112 may reset an offset of the write pointer in each of the plurality of zones. More descriptions regarding the write pointer may be found elsewhere in the present disclosure (e.g., FIGS. 4-7 and relevant descriptions thereof).

It should be noted that the above description regarding the process 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added to the process 1200 and/or one or more operations of the process 1200 described above may be omitted. In some embodiments, operations 1210, 1220, and/or 1230 of the process 1200 may be performed in parallel and/or simultaneously. Alternatively, operations 1210, 1220, and/or 1230 of the process 1200 may be performed in series.

Figure 13:
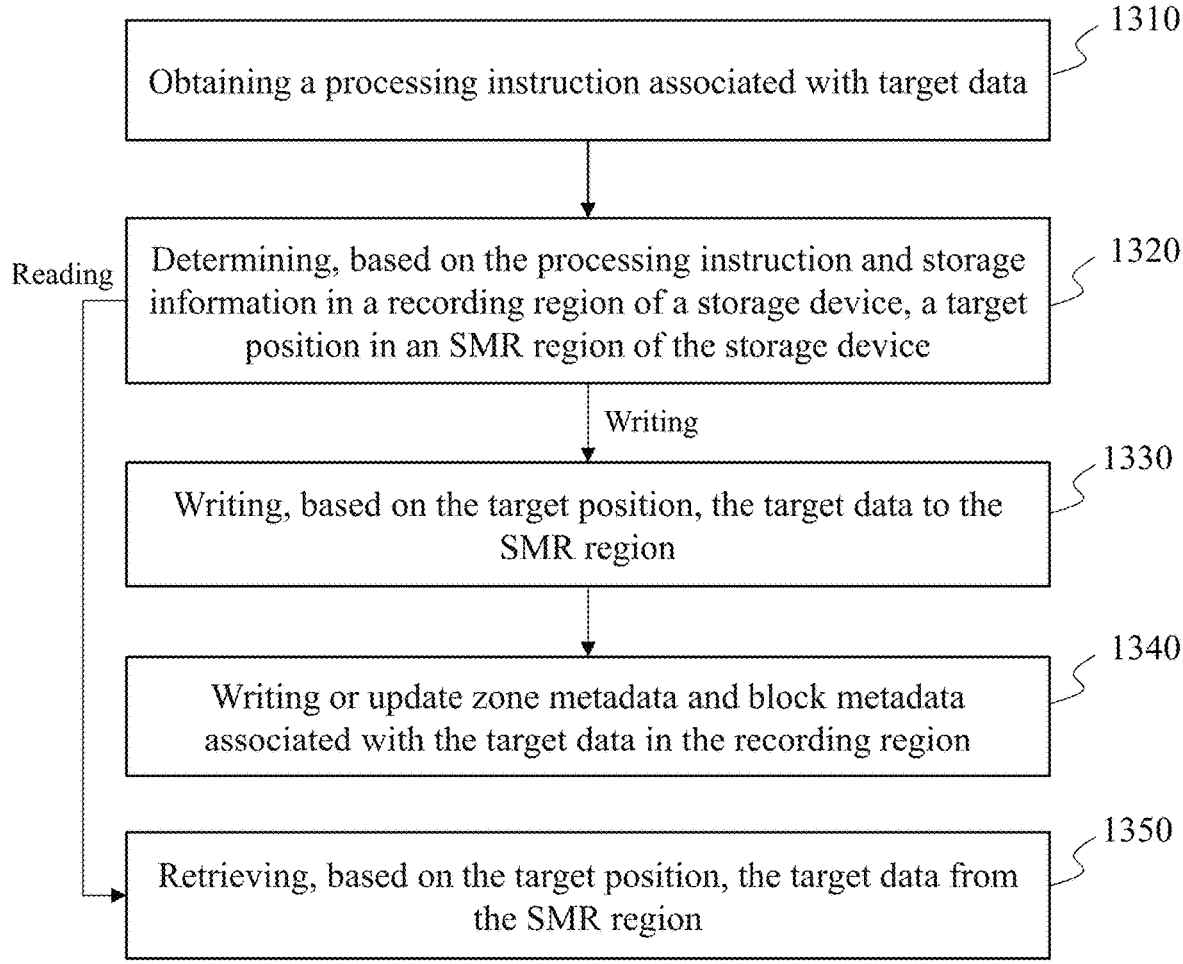
FIG. 13 is a flowchart of an exemplary process for data processing according to some embodiments of the present disclosure.

FIG. 13 is a flowchart of an exemplary process for data processing according to some embodiments of the present disclosure. In some embodiments, one or more operations in the process 1300 may be implemented in the system 100 for data storage illustrated in FIG. 1. For example, one or more operations in the process 1300 may be stored in a storage device (e.g., the storage device 150, the ROM 230, the RAM 240, and/or the storage 390) as a form of instructions, and invoked and/or executed by a processing device 112 (e.g., the processor 220, the CPU 340, and/or one or more modules illustrated FIG. 8). The operations of the illustrated process presented below are intended to be illustrative. In some embodiments, the process may be accomplished with one or more additional operations not described, and/or without one or more of the operations discussed. Additionally, the order in which the operations of the process 1300 as illustrated in FIG. 13 and described below is not intended to be limiting. In some embodiments, the process 1300 may be associated with data processing in a storage device (e.g., the storage device 130). The storage device 130 may be divided into a recording region (including a metadata region, a configuration region, a CRC region, etc.) and an SMR region (including a plurality of zones) before the process 1300 or in response to operation 1310 as described below, more descriptions of which may be found elsewhere in the present disclosure (e.g., operation 910 in FIG. 9).

In 1310, the processing device 112 (e.g., the obtaining module 820) may obtain a processing instruction associated with target data.

The target dada may be similar to the target data described in operation 920, which is not limited herein. The processing instruction may include an index of the target data, how to process the target data, or the like, or any combination thereof. For example, the processing instruction may include storing the target data in the storage device 130, and the processing instruction may also be referred to as a writing instruction. As another example, the processing instruction may include retrieving the target data from the storage device 130, and the processing instruction may also be referred to as a reading instruction. As still another example, the processing instruction may include deleting the target data stored in the storage device 130.

In 1320, the processing device 112 (e.g., the determination module 830) may determine, based on the processing instruction and storage information in the recording region of the storage device 130, a target position in the SMR region of the storage device 130.

In some embodiments, if the processing instruction includes storing the target data, the processing device 112 may obtain the target data based on the processing instruction (e.g., directly from the processing instruction or from the storage device 150, the terminal device 140, or a third database). The processing device 112 may determine, based on zone information of each of the plurality of zones, a target zone from the plurality of zones. For example, the processing device 112 may determine candidate zones (e.g., free zones and/or partially-used zones) based on the metadata information and/or zone metadata of each of the plurality of zones. The processing device 112 may determine, based on a size of the target data, a target zone from the candidate zones. Further, the processing device 112 may determine the target position based on the target zone. More descriptions regarding the determination of the target position may be found elsewhere in the present disclosure (e.g., operation 930 and the description thereof).

In some embodiments, if the processing instruction includes retrieving or deleting the target data, the processing 112 may obtain, based on the index of the target data, block metadata of the target data from the metadata region of the storage device 130. The processing device 112 may determine the target position based on the block metadata of the target data.

In 1330, in response to the processing instruction being a writing instruction, the processing device 112 (e.g., the processing module 840) may write, based on the target position, the target data to the SMR region of the storage device 130 (e.g., write the target data in the SMR region from a position of the write pointer corresponding to the target position).

In 1340, the processing device 112 (e.g., the processing module 840) may write or update zone information and block metadata associated with the target data in the recording region (e.g., the metadata region thereof).

For example, the processing device 112 may write the block metadata of the target data in the metadata region. The block metadata of the target data may include a data length of the target data, the creation time of the target data, an index of the target data, etc. As another example, the processing device 112 may write the CRC value(s) of the target data in the CRC region. As still another example, the processing device 112 may write/update, in the metadata region, the zone metadata of the target zone that stores the target data. For instance, if the target zone is initially allocated for storage (i.e., the target zone being a free zone), the processing device 112 may write the zone metadata of the target zone in the metadata region; and if the target zone is a partially-used zone, the processing device 112 may update the zone metadata of the target zone in the metadata region. The zone metadata of the target zone may include a count of target data blocks that have been written to the target zone, and an offset of the write pointer of the target zone. More descriptions regarding the writing and/or updating of the zone information and block metadata associated with the target data may be found elsewhere in the present disclosure (e.g., operation 940 and relevant descriptions thereof).

According to writing the metadata information associated with the target data in the metadata region, the storage device 130 may store only a piece of the metadata information, and may not store intermediate indexes in the storage region, which may save the storage space of the storage region.

In 1350, in response to the processing instruction being a reading instruction, the processing device 112 (e.g., the processing module 840) may retrieve, based on the target position, the target data from the SMR region.

In some embodiments, the processing device 112 may determine an initial offset of the write pointer when the target data starts to be written. The processing device 112 may read a data length of the target data from the initial offset of the write pointer to obtain the target data from the SMR region.

In some embodiments, if the processing instruction is a deleting instruction, the processing device 112 may delete, based on the target position, the target data from the SMR region.

It should be noted that the above description regarding the process 1300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added to the process 1300 and/or one or more operations of the process 1300 described above may be omitted. For example, an operation may be added before or after the operation 1310 for dividing the storage device 130.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system," Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language. Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method for data storage in a storage device, the method comprising:
dividing the storage device into a recording region and a shingled magnetic recording (SMR) region, the SMR region being configured to store data only, and the recording region being configured to store storage information associated with the storage device, wherein
the recording region includes a configuration region configured to store configuration information of the storage device, a metadata region configured to store metadata information of the data, and a checking region configured to store checking information of the data,
the SMR region is divided into a plurality of zones, and
the storage information includes at least a corresponding relationship between an index of the data and a storage location of the data, and zone information of each of the plurality of zones;
obtaining target data to be stored, wherein the target data includes one or more target data blocks, the target data blocks are stored in a same zone or different zones of the SMR region; and
determining, based on the target data and the storage information, a target position in the SMR region for storing the target data, comprising:
determining, based on the target data and the zone information, one or more candidate zones from the plurality of zones, wherein an available storage capacity of each of the one or more candidate zones is larger than a size of the target data;

determining a target zone from the one or more candidate zones; and determining the target position based on the target zone.

2. The method of claim 1, wherein each of the plurality of zones is configured to store one or more data blocks in series, the zone information of each of the plurality of zones includes an available state of the zone, and the available state includes a free state, a used state, or a partially-used state.

3. The method of claim 1, wherein for each of the one or more target data blocks, the method further includes:

labeling block metadata of the target data block with a first identifier indicating that the target data block is being written to the SMR region; or labeling the block metadata of the target data block with a second identifier indicating that the target data block has been written to the SMR region.

4. The method of claim 3, wherein the method further includes:

updating, in the block metadata of the target data block, a data length of the target data block that has been written to the SMR region.

5. The method of claim 1, wherein the storage information further includes a cyclic redundancy check (CRC) value of the target data for checking an accuracy of the target data.

6. The method of claim 1, wherein the dividing the storage device into the recording region and the SMR region includes:

formatting the storage device to divide the storage device into the recording region and the SMR region.

7. The method of claim 6, wherein the formatting the storage device includes:

resetting a position of a write pointer of each of the plurality of zones;

storing the configuration information of the storage device in the recording region; or establishing a file system in the recording region, the file system being configured to store metadata of the data using a key-value database.

8. The method of claim 1, further comprising:

storing, in the recording region, a corresponding relationship between an index of the target data and the target position for retrieving, in the SMR region, the target data.

9. The method of claim 8, further comprising:

after the target data is stored in the SMR region, obtaining a request for retrieving the target data, the request including the index of the target data;

determining, based on the index of the target data, the target position from the recording region; and retrieving, based on the target position, the target data from the SMR region.

10. The method of claim 2, wherein the recording region further includes one or more spare regions, the checking region is spaced by the one or more spare regions, and the one or more spare regions are used to expand a storage capacity of a region that is adjacent to the one or more spare regions.

11. The method of claim 1, wherein a storage capacity of each of the plurality of zones is same or different.

12. The method of claim 1, wherein the determining the target zone from the one or more candidate zones, comprising:

ranking the one or more candidate zones according to storage capacities of the one or more candidate zones in an ascending order or a descending order;

determining the target zone from the one or more candidate zones based on a ranking result.

13. The method of claim 12, wherein the determining the target position based on the target zone, comprising:

determining a location of the target zone in the storage device based on zone information of the target zone stored in the configuration region;

determining a position, in the target zone, of a write pointer of the target zone based on zone metadata of the target zone stored in the metadata region;

determining the target position based on the location of the target zone in the storage device and the position, in the target zone, of the write pointer of the target zone.

14. The method of claim 13, further comprising: before determining the target position based on the target zone, correcting the position of the write pointer of the target zone, comprising:

obtaining the position, in the target zone, of the write pointer of the target zone based on the zone metadata of the target zone;

obtaining an actual position of the write pointer in the target zone; and correcting the position, in the target zone, of the write pointer based on the actual position of the target zone.

15. The method of claim 1, wherein for the target data including one target data block, the method further comprises:

determining whether a size of the target data block of the target data is greater than a preset block size;

in response to determining that the size of the target data block is less than the preset block size, determining the target zone from partially-used zones of the plurality of zones for storing the target data block;

in response to determining that the size of the target data block is greater than the preset block size, determining the target zone from free zones of the plurality of zones for storing the target data block, the free zones referring to zones not used.

16. The method of claim 1, wherein for the target data including more than one target data blocks, the method further comprises:

in response to determining a size of the target data is less than a storage capacity of a free zone, storing the target data blocks of the target data in a single target zone in series;

in response to determining the size of the target data is greater than the storage capacity of the free zone, storing a first count of the target data blocks of the target data in a first target zone and storing a second count of the target data blocks of the target data in a second target zone, the first target zone and the second target zone being adjacent or not-adjacent different zones.

17. The method of claim 10, the determining the target zone from the one or more candidate zones; and determining the target position based on the target zone, comprising:

ranking the one or more candidate zones according to storage capacities of the one or more candidate zones in an ascending order or a descending order;

determining the target zone from the one or more candidate zones based on a ranking result;

determining a location of the target zone in the storage device based on zone information of the target zone stored in the configuration region;

obtaining a position, in the target zone, of a write pointer of the target zone based on zone metadata of the target zone stored in the metadata region;

obtaining an actual position of the write pointer in the target zone; and correcting the position of the write pointer based on the actual position of the target zone;

determining the target position based on the location of the target zone in the storage device and a corrected position of the write pointer in the target zone.

18. A method for data storage in a storage device, the method comprising:

dividing the storage device into a recording region and a shingled recording (SMR) region, the SMR region being configured to store data only, and the recording region being configured to store storage information associated with the data, wherein the recording region includes a configuration region configured to store configuration information of the storage device, a metadata region configured to store metadata information of the data, and a checking region configured to store checking information of the data, the SMR region is divided into a plurality of zones, and the storage information includes at least a corresponding relationship between an index of the data and a storage location of the data, and zone information of each of the plurality of zones;

obtaining a processing instruction associated with target data wherein the target data includes one or more target data blocks, the target data blocks are stored in a same zone or different zones of the SMR region;

determining, based on the processing instruction and the storage information, a target position in the SMR region, comprising:

determining, based on the target data and the zone information, one or more candidate zones from the plurality of zones, wherein an available storage capacity of each of the one or more candidate zones is larger than a size of the target data;

determining a target zone from the one or more candidate zones; and determining the target position based on the target zone; and processing the target data in the target position.

19. The method of claim 18, wherein the processing instruction includes storing the target data, and the processing the target data in the target position includes:

writing the target data in the target position.

20. A non-transitory computer readable medium, comprising executable instructions that, when executed by at least one processor, direct the at least one processor to perform a method for data storage in a storage device, the method comprising:

dividing the storage device into a recording region and a shingled magnetic recording (SMR) region, the SMR region being configured to store data only, and the recording region being configured to store storage information associated with the storage device, wherein the recording region includes a configuration region configured to store configuration information of the storage device, a metadata region configured to store metadata information of the data, and a checking region configured to store checking information of the data, the SMR region is divided into a plurality of zones, and the storage information includes at least a corresponding relationship between an index of the data and a storage location of the data, and zone information of each of the plurality of zones;

obtaining target data to be stored, wherein the target data includes one or more target data blocks, the target data blocks are stored in a same zone or different zones of the SMR region; and determining, based on the target data and the storage information, a target position in the SMR region for storing the target data, comprising:

determining, based on the target data and the zone information, one or more candidate zones from the plurality of zones, wherein an available storage capacity of each of the one or more candidate zones is larger than a size of the target data;

determining a target zone from the one or more candidate zones; and determining the target position based on the target zone.

* * * * *